(12) United States Patent
Friedrich

(10) Patent No.: US 6,226,932 B1
(45) Date of Patent: May 8, 2001

(54) BUILDING WITH STORM-PROOF ROOM

(76) Inventor: Helmuth Friedrich, Hezeberg Strase 15, 74172 Neckarsulm (DE)

( * ) Notice: Subject to any disclaimer, the term of this patent is extended or adjusted under 35 U.S.C. 154(b) by 0 days.

(21) Appl. No.: 09/414,754

(22) Filed: Oct. 7, 1999

(51) Int. Cl.[7] .................................................. E04H 6/02
(52) U.S. Cl. .......................................... 52/79.1; 52/169.6
(58) Field of Search .......................... 52/202, 79.1, 79.9, 52/169.1, 169.6, 143, 27, 36.4; 109/1.5; 108/42, 48

(56) References Cited

U.S. PATENT DOCUMENTS

| | | | |
|---|---|---|---|
| 2,559,021 | * | 7/1951 | Leonard ............................ 108/48 X |
| 3,042,978 | * | 7/1962 | Eames et al. ..................... 108/48 X |
| 4,126,972 | * | 11/1978 | Silen ................................. 52/169.6 X |
| 4,470,227 | * | 9/1984 | Bigelow, Jr. et al. .............. 52/79.1 |
| 4,876,832 | * | 10/1989 | Wasserman ....................... 52/79.1 |
| 5,210,985 | * | 5/1993 | Hsu ................................... 52/169.6 |
| 5,600,923 | * | 2/1997 | Riley ................................. 52/169.6 X |
| 5,893,241 | * | 4/1999 | Schroeder ........................ 52/79.1 |
| 5,956,907 | * | 9/1999 | Martin .............................. 52/169.1 |
| 5,979,128 | * | 11/1999 | Parsons ............................ 52/169.6 |

FOREIGN PATENT DOCUMENTS

2511424 * 2/1993 (FR) .................................. 52/169.6

* cited by examiner

Primary Examiner—James O. Hansen
(74) Attorney, Agent, or Firm—William E. Noonan

(57) ABSTRACT

A wind-resistant room is constructed within a building without a cellar. The room includes a plurality of pre-cast concrete wall panels inflexibly secured to and extending outwardly from a concrete floor slab of the building. The wall panels are interior to and separate and distinct from the exterior walls of the building and are inflexibly connected to one another to surround an interior space within the building. A pre-cast concrete ceiling panel is inflexibly connected to an upper edge of each pre-cast wall panel interiorly of and separate and distinct from the roof of the building. The pre-cast wall panels and pre-cast ceiling panel define a wind-resistant enclosure within the building. At least one of the pre-cast wall panels includes a doorway and carries a wind-resistant door that is selectively extendable across the doorway.

13 Claims, 5 Drawing Sheets

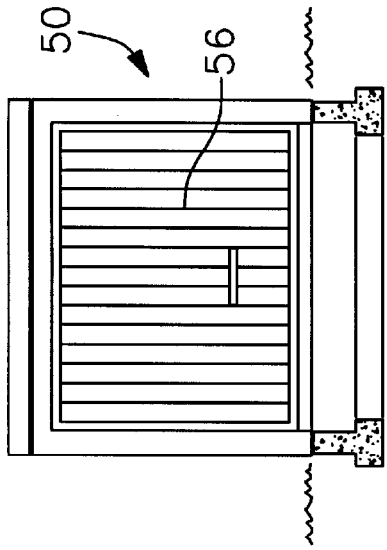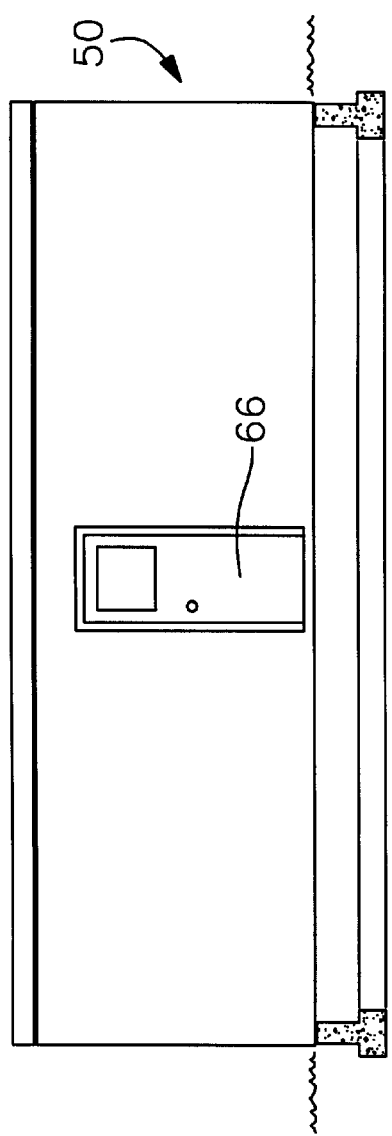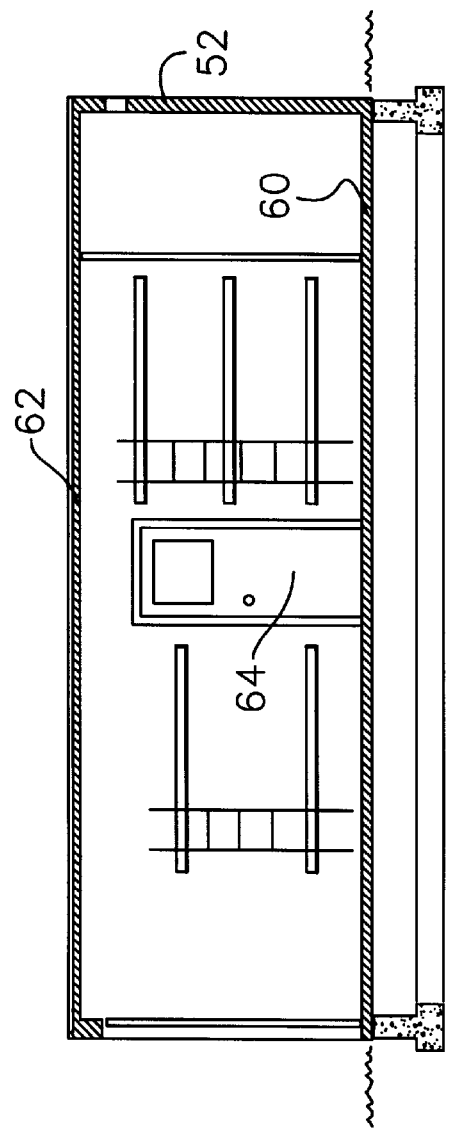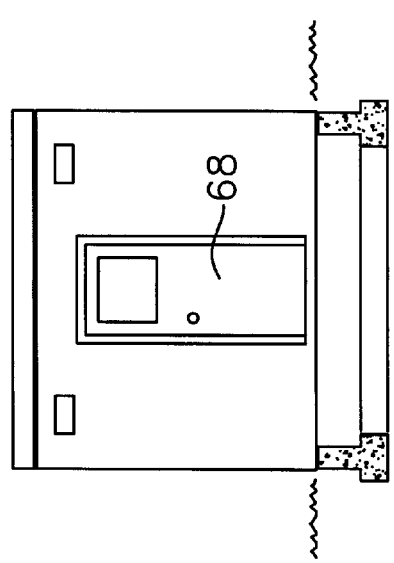

BUILDING WITH STORM-PROOF ROOM

FIELD OF THE INVENTION

This invention relates to a building have a storm-proof room suitable for sheltering people during hurricanes and other severe wind storms.

BACKGROUND OF THE INVENTION

In North America, severe whirlwinds, such as hurricanes, occur frequently, especially in the hot-weather season. Hurricanes are extremely destructive. The extreme differences in air pressure in the area of influence of a hurricane can remove entire roofs from buildings and wreak severe damage in other ways to and in buildings. There is an extremely high risk of injury to people from objects or components falling over or swirling around in the air.

In states adjoining the Gulf of Mexico, such as Florida, and on the Atlantic coast, residential buildings are often built without a cellar because the ground water level is very high. The buildings have only a concrete floor slab, which stands on concrete strip foundations. Generally, the walls of these houses are made from hollow masonry blocks. The roof structure comprises a wooden structure. Very often use is made of wooden trusses, especially nailed trusses, which span the entire interior of the building concerned. Such buildings, which are very economical to construct, cannot withstand the effects of a hurricane. The roof structure of these houses at the very least is often completely destroyed by a hurricane. When a hurricane approaches, the people in the residential areas affected are evacuated for their own safety.

SUMMARY OF THE INVENTION

The object on which the invention is based is to indicate a way of avoiding evacuating people when there is a risk of a hurricane.

This invention is specified by the features of the main claim. Taking a building without a cellar as a starting point, the invention is distinguished by the fact that at least one room of such a building is of whirlwind-proof design. This means that people do not have to leave the area where they live but can remain on their property; when a hurricane approaches, the people can move to their own whirlwind-proof room and remain there for the duration of the storm. The residential areas affected by the hurricane are thus not abandoned and the risk of looting is thus avoided.

A room of this kind can be manufactured in a particularly economical manner as a prefabricated unit. The entire room can be produced as a prefabricated unit. However, it is also possible to prefabricate just a frame structure made of metal or wood, for example, and then provide this frame structure, while similarly at the manufacturer's or at the site where the room is to be erected, with rain-proof and wind-proof infilling. The infilling is then present in the region of the walls, and the ceiling and floor if required. The frame structure is flexurally rigid to ensure the stability of the room.

The whirlwind-proof room can form a special room in a residential building. However, it is also possible to provide a whirlwind-proof room outside the residential building proper. Such a building could take the form of a garage for a care or a tool shed, for example, allowing the room to be used as a garage or store room during periods when there are no whirlwinds.

In one embodiment, illustrated in the drawings, the whirlwind-proof room has a concrete ceiling and concrete walls. In addition, a concrete floor slab can also be provided. The ceiling, walls and, if required, the floor slab are connected to one another in a flexurally rigid manner. Openings in the concrete walls can be designed as a storm-proof door or storm-proof window.

If the window or the door itself are not of storm-proof design, the whirlwind resistance of the entire room, including the area of this door or window, can be ensured by means of a storm-proof flap that can be pivoted in front of the door, in particular. This flap can be pivotably mounted in such a way that, in its lower position, it acts as a floor panel outside the room and that, in its upper position, it completely covers the door from outside. Since the danger will occur very seldom, if at all, it is generally sufficient to enable the flap to be raised and lowered by hand, by means of pull cables, rather than by motor. If the flap is too heavy, block and tackle arrangements can be provided to make raising and lowering easier in terms of the forces involved.

To allow people to stay in a room of this kind for several days in relative comfort when danger threatens, tables and seats can be provided in such a way that this furniture can be folded up against the wall. The room can then be used as a garage for cars or a tool storage room or for other purposes without the furniture forming an obstruction in the interior of the room.

In addition, a separate storage chamber and toilet cubicle can be provided in the whirlwind-proof room. The whirlwind-proof room and, for example, the storage chamber in it can furthermore be equipped with an emergency power unit. This emergency power unit can be used to provide an emergency supply of electric power to the electric loads in the room. The room can thus provide a self-contained refuge that will allow people to survive for several days.

To increase the stability of a whirlwind-proof room of this kind, it can be anchored to single footing foundations or strip footing foundations in a manner resistant to tensile forces. If the whirlwind-proof room is provided within a building, the room is generally anchored to the concrete floor slab in the room in a manner resistant to tensile forces.

Further advantageous configurations and advantages of the invention will become apparent from the other features indicated in the claims and from the embodiment examples below.

BRIEF DESCRIPTION OF THE DRAWINGS

Other objects, features and advantages will occur from the following description of a preferred embodiment and the accompanying drawings, in which:

FIG. 3 is a partial sectional side view of a whirlwind-proof room according to the invention designed as a garage;

FIG. 4 is a front view of the room shown in FIG. 3;

FIG. 5 is a rear view of the room shown in FIG. 3;

FIG. 6 is a longitudinal sectional view of the room shown in FIG. 3;

DETAILED DESCRIPTION OF PREFERRED EMBODIMENTS

Figure 1:
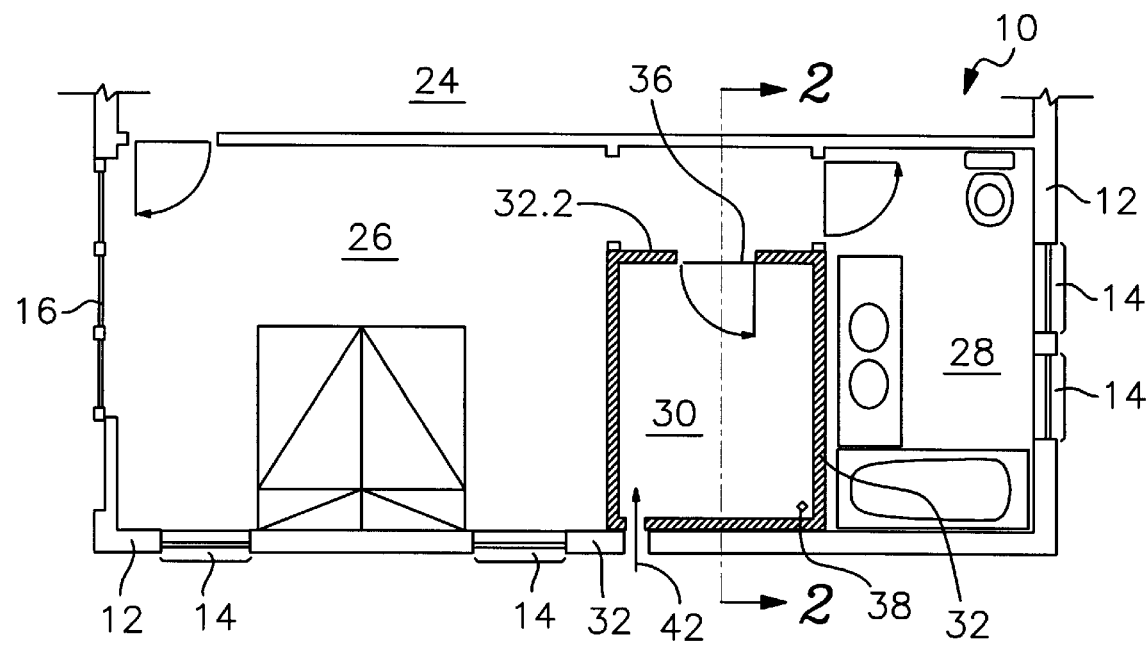
FIG. 1 is a plan view of a whirlwind-proof room forming a separate part of a residential building.
Figure 2:
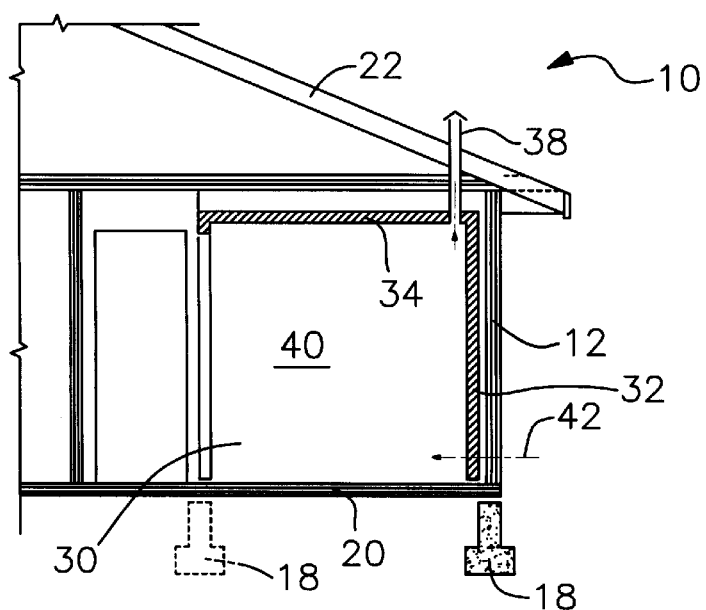
FIG. 2 is a sectional view taken along the line 2—2 of FIG. 1.
Figure 7:
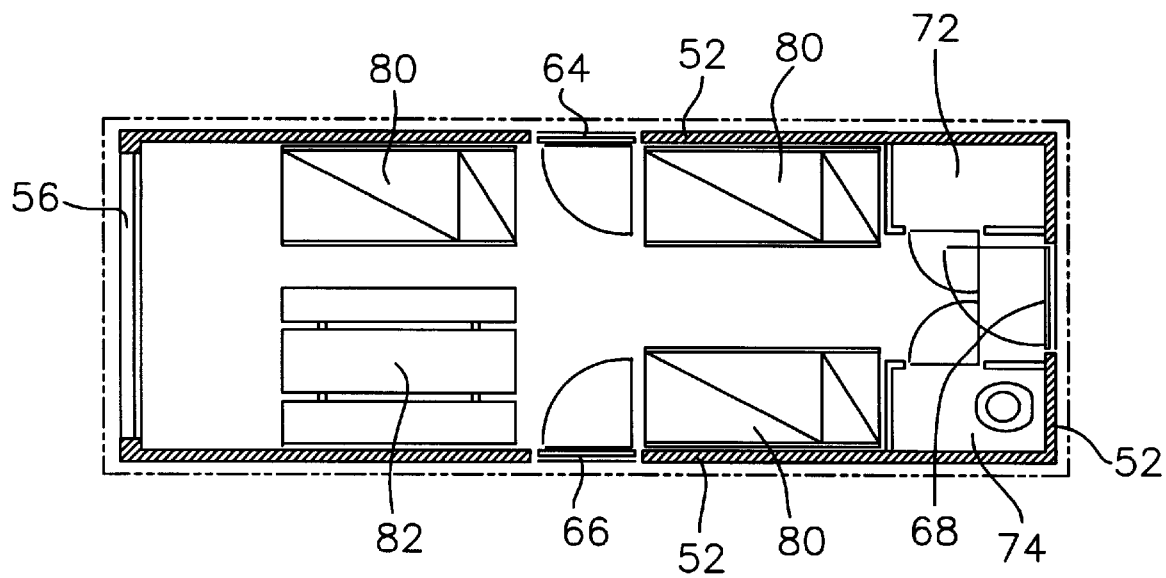
FIG. 7 is a plan view of the room shown in FIG. 3.

A residential building 10 illustrated in FIGS. 1 and 2 has exterior walls 12 made of hollow masonry blocks. Windows 14 and doors, e.g. a glass sliding door 16, have been fitted in the exterior walls.

The exterior walls 12 rest on an all-round strip footing foundation 18. The floor of the residential building 10 is formed by a concrete floor slab 20, which is firmly connected to the strip foundations 18.

The roof 22 has wooden trusses, the ends of which rest on the exterior walls 12. The roof 22 spans the rooms of the residential building 10 in an unsupported manner. In the present case, these rooms are a living room 24 (merely indicated), a bedroom 26 and a bathroom 28. Between the bathroom 28 and the bedroom 26 there is, in addition, a room 30 of whirlwind-proof design.

The room 30 has its own all-round concrete walls 32 and its own concrete ceiling 34. A whirlwind-proof door 36 is fitted in one concrete wall 32.2. Doors of this kind are known per se from the prior art.

A ventilation pipe 38 penetrates the concrete ceiling 34 and the roof 22, connecting the interior 40 of the room 30 to the outside atmosphere. An air inlet opening 42 is provided near the floor of the room 30. This makes it possible for people to stay for as much as several days in the fully enclosed room 30.

The exterior walls 32 of the room 30 are connected to the floor slab 20 in a manner resistant to tensile forces. Even if the residential building 10 is completely destroyed by a hurricane, the room 30 thus remains stable and immovable on the floor slab 20 without being destroyed. People sheltering in the room 30 are thus safe from sections of the building that are whirled around in the air or falling.

In FIGS. 3–8, a whirlwind-proof room is designed in the manner of a garage 50. This garage has two relatively long concrete side walls 52 opposite one another, these being connected at one end by a shorter concrete end wall 54 and, at the other end, by a storm-proof door 56. The floor is formed by a concrete floor slab 60 and the ceiling is likewise formed by a concrete slab 62. All the concrete walls and floor and ceiling slabs are connected to one another in a flexurally rigid (i.e. inflexible) manner.

A storm-proof door 64, 66 has been installed in each of the two concrete side walls 52. A storm-proof door 68 has also been installed in the concrete end wall 52. These three doors are intended to show in what areas of the walls doors can be arranged. The garage 50, which is manufactured as a complete prefabricated unit, can therefore be fitted with different numbers of doors 64, 66, 68 of different sizes, according to the wishes of the respective buyer. A storm-proof window has been installed in the doors 64, 66, 68.

In the garage 50 illustrated in the drawing, there is a separate room 72. This room can be used to accommodate an emergency power unit, for example. It is also possible for tools, equipment or other objects, such as food, to be stored in this room 72. In addition, there is another room 74, which can be used as a toilet.

The remainder of the interior 76 of the garage 50 is fitted with bedsteads 80 and a seat/table combination 82. The bedsteads 80 are attached to the exterior wall 52 by a hinge 84 and can be raised against the exterior wall 52 concerned, as indicated by arrows 86 in FIG. 8. In the present case, two bedsteads 80 are attached one above the other to the inside of each side wall 52.

Figure 8:
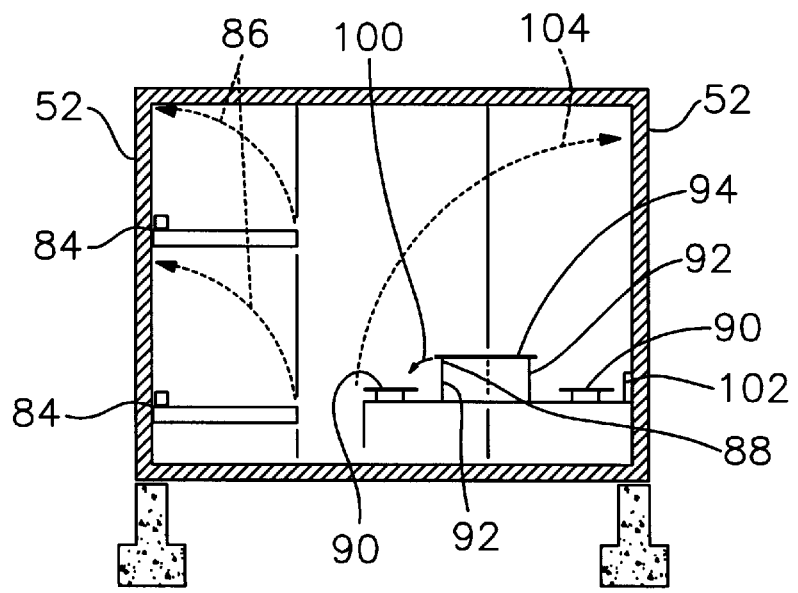
FIG. 8 is a sectional view taken along the line 8—8 in FIG. 7.

The seat/table furniture combination 82 comprises a support plate structure 88, the seating surfaces 90 and a table top 94 between them, resting on small supports 92. On the one hand, the supports 92 can be folded over sideways, as indicated by the arrow 100. On the other hand, the entire support plate structure 88, which is attached to one side wall 52 by a hinge 102, can be folded up against the inside of this side wall 52, as indicated by arrow 104 (FIG. 8).

With the bedsteads 80 and the seat/table furniture combination 82 raised, the interior 76 can be used, for example, to accommodate a motor vehicle, and the entire space 50 can thus be used as a garage. In an emergency, when a hurricane is approaching, the garage is cleared and, for example, the car parked in it is driven out of the garage. The beds and seats can then be folded down from the walls and the garage 50 used as a storm-proof room.

Figure 9:
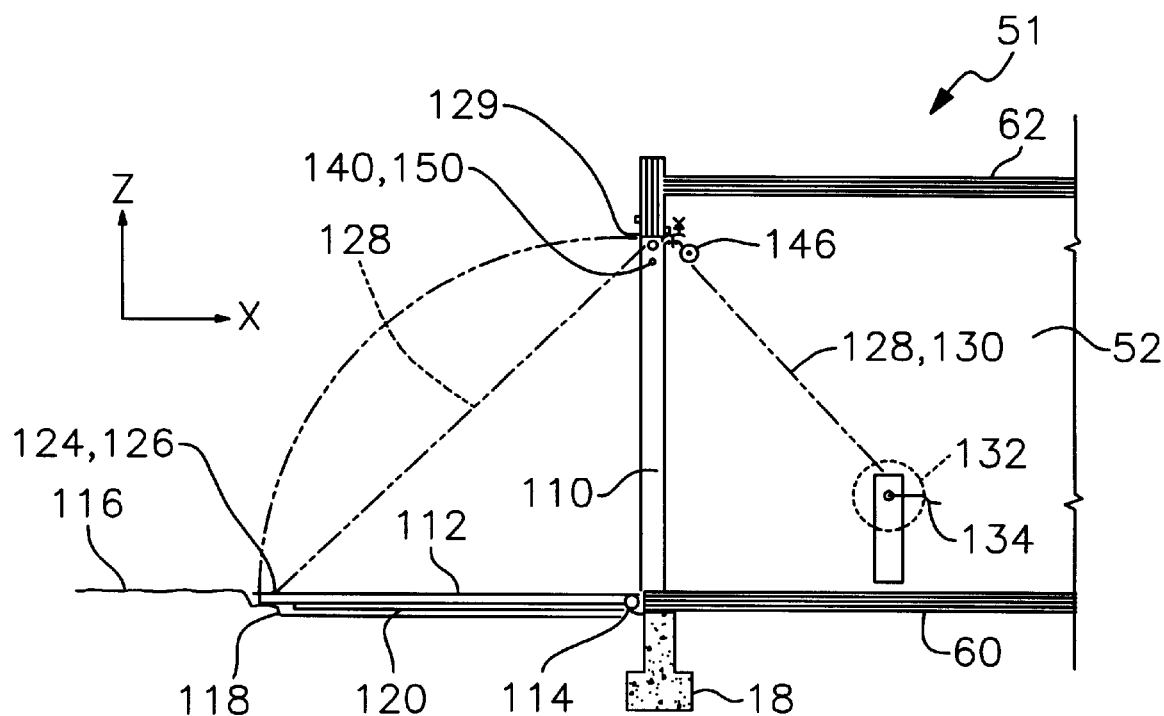
FIG. 9 is a longitudinal sectional view of another room in accordance with the invention, the door of which (not shown in the drawing) can be closed off by means of a storm-proof flap, the flap being in its lowered position.

Like the garage 50 already described above, the garage 51 shown as a detail in FIGS. 9 and 10 is designed as a prefabricated concrete unit. Thus this garage 51 has a concrete floor slab 60, a concrete slab 62 as a roof and concrete side walls 52. At one end of this garage 51 there is a door opening 110 in which there is a door (not shown in the drawing). This door can be a pivoted door 56 similar to the pivoted door 56 of a garage 50. In the case of a garage 51, the door in the door opening 110 is not storm-proof. For this reason, the door in the door opening 110 is protected from the outside by a whirlwind-proof flap 112 when a hurricane is approaching.

The flap 112 is attached to the outside of the floor slab 60 by a hinge arrangement 114. In its lowered position, shown in FIG. 9, the flap 112 forms a ramp-like connection between the floor slab 60 and the upper edge 116 of the ground outside the garage 51. In this ground there is a recess 118 in which the flap 112 rests in the state shown in FIG. 9. This ensures that the flap 112 does not protrude above the upper edge 116 of the ground and form an obstruction. There are a plurality of reinforcing bars 120 rigidly attached to a plate 122 on the underside (FIG. 9) or outside of the flap 112. In the present example, the reinforcing bars 120 and the plate 122 are made of metallic material. When the flap 112 is raised in front of the door opening 110, these reinforcing bars 120 are on the outside of the flap 112.

The flap 112 is attached at two lateral points 124, 126 on the outside to two pull cables 128, 130. The pull cables 128, 130 are passed via a number of deflection pulleys to a winding pulley 132, which can be turned by means of a hand crank 134. The two pull cables 128, 130 can be wound on or off synchronously by actuating the hand crank 134. The flap 112 can thereby be raised or lowered into its lower position (illustrated in FIGS. 9 and 10) in corresponding fashion.

Figure 10:
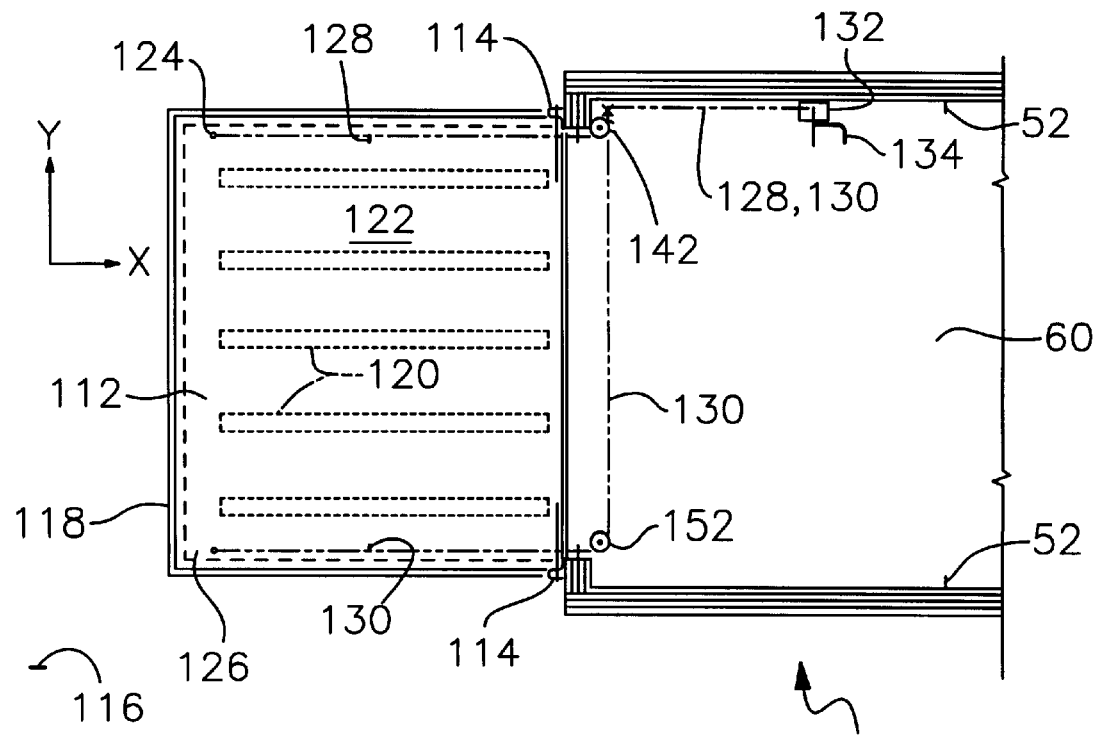
FIG. 10 is a plan view of the area of the flap shown in FIG. 9.
Figure 11:
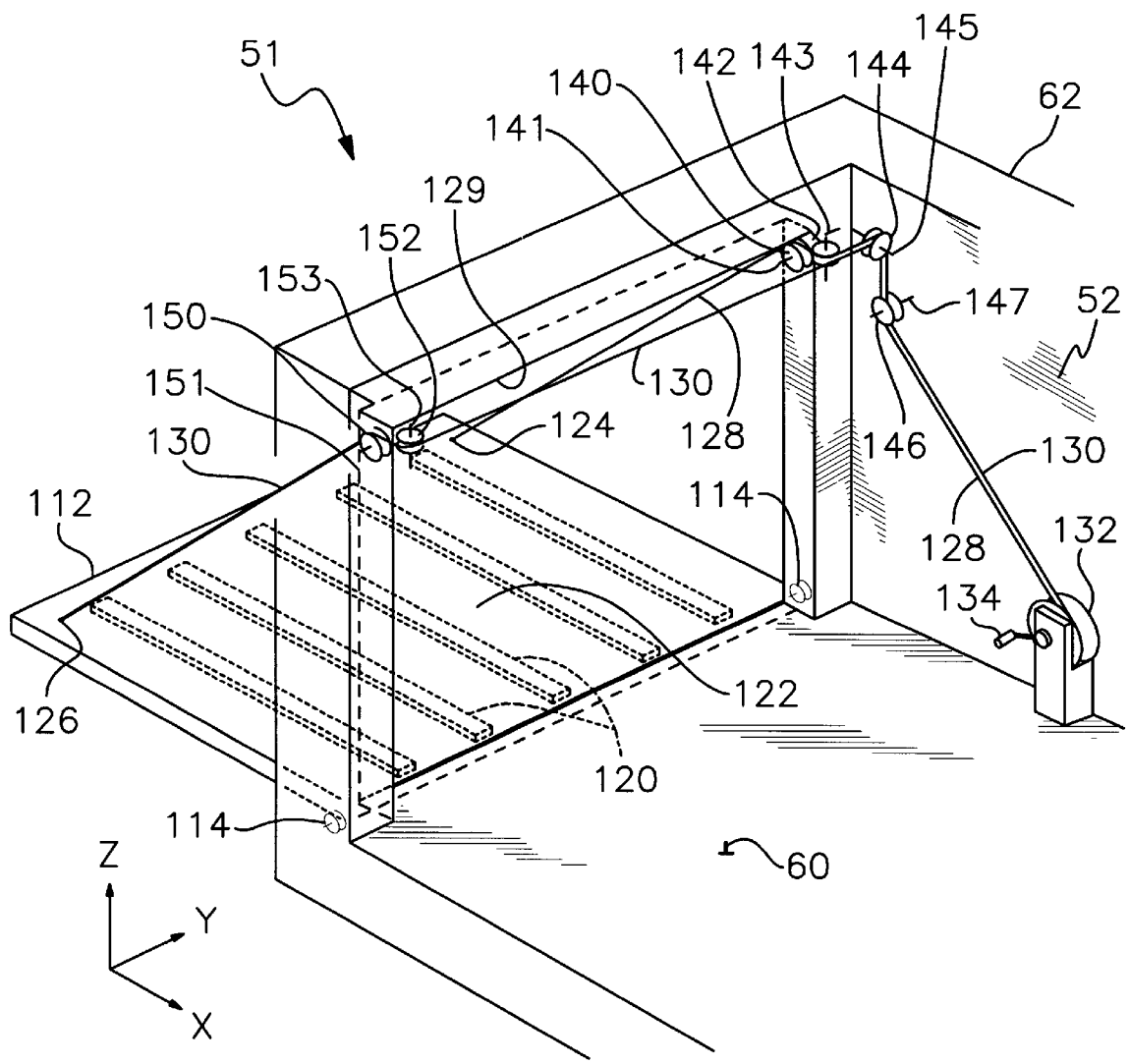
FIG. 11 is a perspective view of the pull cable guide for the flap shown in FIGS. 9 and 10.

FIG. 11 shows the guidance system for the two pull cables 128, 130 in diagrammatic form. The upper pull cable 128 in FIG. 10 passes via a first deflection pulley 140, which is mounted below the lintel 129 of the door, at the side of the door opening 110. The axis 141 of deflection pulley 140 is aligned in the Y direction and hence parallel to the lintel 129 of the door. The pull cable 128 is then passed via a second deflection pulley 142, the axis 143 of which is aligned in the Z direction. The pull cable 128 then passes via a third deflection pulley 144, the axis 145 of which is aligned in the X direction. Finally, the pull cable 128 passes via another deflection pulley 146, the axis 147 of which is aligned in the Y direction, to the winding pulley 132.

The lower pull cable 130 in FIG. 10 passes via a deflection pulley 150, the axis 151 of which is aligned in the Y direction, and via another deflection pulley 152, the axis 153 of which is aligned in the Z direction, to the deflection pulley 142 already mentioned above and, from there, via deflection pulleys 144 and 146, to the same winding pulley 132. From deflection pulley 142 onwards, the two pull cables 128, 130 are thus both present on the subsequent deflection pulleys and the winding pulley 132. The arrangement and alignment of the two deflection pulleys 150, 152 correspond to those of the two deflection pulleys 140, 142. It is thus possible to wind the two pull cables 128, 130 on and off uniformly with a single winding pulley 132. This allows the flap 112 to be raised and lowered without twisting. If the weight of the flap 112 is too great or the tensile forces in the two pull cables 128, 130 become too large, a block and tackle arrangement could be fitted in between to reduce the forces that have to be applied by means of the hand crank 134. Admittedly, the winding pulley 132 would then have to be of larger volume.

Although specific features of the invention are shown in some of the drawings and not others, this is for convenience only, as each feature may be combined with any and all of the other features in accordance with this invention.

Other embodiments will occur to those skilled in the art and are within the following claims:

What is claimed is:

1. A wind-resistant building supported on the ground, said building comprising:

a footing supported by the ground;

a horizontal concrete slab mounted on said footing;

a plurality of pre-cast concrete vertical walls inflexibly mounted to the slab above said footing and inflexibly connected to one another to surround an interior space;

a horizontally planar pre-cast concrete ceiling inflexibly connected to said wall panels to enclose said interior space, at least one of said wall panels including a doorway; and a door for selectively closing said doorway, said door including a pre-cast concrete flap that is pivotably mounted to said slab, said flap being alternated between an open condition wherein said flap engages the ground and a raised position wherein said flap engages and closes said doorway.

2. The building of claim 1 further including means for selectively raising and lowering said flap.

3. The building of claim 2 in which said means for selectively raising and lowering include a winch and cable mechanism.

4. The building of claim 1 wherein at least one bedstead is foldably mounted an interior surface of one of said pre-cast wall panels.

5. The building of claim 1 including a table and seat structure foldably mounted to an interior surface of one of said concrete wall panels.

6. The building of claim 1 further including means defining a storage chamber in the building.

7. The building of claim 1 further including means defining a toilet cubicle in the building.

8. The building of claim 1 further including an emergency power unit disposed in the building for supplying emergency electric power to electric loads located in the building.

9. The building of claim in which said flap carries at least one reinforcing component.

10. The building of claim 9 in which said reinforcing component includes a metal plate attached to an exterior surface of said flap.

11. The building of claim 10 in which said reinforcing component includes a plurality of metal reinforcing bars rigidly attached to said plate.

12. A wind resistant garage supported on the ground, said building comprising:

a footing supported by the ground;

a horizontal concrete slab mounted on said footing;

a plurality of pre-cast concrete vertical walls inflexibly mounted to said slab above said footing and inflexibly connected to one another to surround an interior space;

a horizontally planar pre-cast concrete ceiling inflexibly connected to said wall panels to enclose said interior space, one of said wall panels including a doorway; and a door for selectively closing said doorway, said door including a pre-cast concrete flap that is pivotably mounted to said slab, said flap being alternated between an open position wherein said flap forms a ramp-like connection between said flap and the ground outside said garage and a raised positioned wherein said flap engages and closes said doorway.

13. The garage of claim 12 in which a metal reinforcing component is fixed to an exterior surface of said flap for reinforcing said flap in the open position whereby wheeled vehicles may be driven into and out of said garage over the opened flap.

* * * * *